United States Patent
Banerjee et al.

(10) Patent No.: US 7,281,024 B1
(45) Date of Patent: Oct. 9, 2007

(54) APPROACH FOR PROPAGATING CHANGES FROM A DATABASE TO A CLIENT

(75) Inventors: Pradeep Banerjee, Los Gatos, CA (US); Shyyunn Sheran Lin, San Jose, CA (US); Jung Tjong, Davenport Court, CA (US)

(73) Assignee: Cisco Technology, Inc., San Jose, CA (US)

( * ) Notice: Subject to any disclaimer, the term of this patent is extended or adjusted under 35 U.S.C. 154(b) by 507 days.

(21) Appl. No.: 10/293,547

(22) Filed: Nov. 12, 2002

(51) Int. Cl.
 *G06F 17/30* (2006.01)
(52) U.S. Cl. ............... 707/204; 707/101; 707/104.1; 707/201; 707/202; 707/203; 707/205
(58) Field of Classification Search ............. 707/101, 707/100, 104.1, 201, 202, 203, 204, 205; 711/161; 348/333.12; 708/300
 See application file for complete search history.

(56) References Cited

U.S. PATENT DOCUMENTS

| | | | |
|---|---|---|---|
| 5,890,156 | A | 3/1999 | Rekieta et al. |
| 6,223,187 | B1 | 4/2001 | Boothby et al. |
| 6,330,568 | B1 | 12/2001 | Boothby et al. |
| 6,405,218 | B1 | 6/2002 | Boothby et al. |
| 6,708,187 | B1 * | 3/2004 | Shanumgam et al. ....... 707/201 |
| 6,954,765 | B2 * | 10/2005 | Spiegel ....................... 707/200 |
| 7,191,436 | B1 * | 3/2007 | Durr et al. ................... 717/170 |
| 2001/0052058 | A1 * | 12/2001 | Ohran ......................... 711/161 |
| 2003/0023609 | A1 * | 1/2003 | Della-Libera et al. ...... 707/101 |
| 2003/0140050 | A1 * | 7/2003 | Li et al. ...................... 707/100 |
| 2003/0193602 | A1 * | 10/2003 | Satoh et al. ............ 348/333.12 |
| 2004/0073582 | A1 * | 4/2004 | Spiegel ....................... 707/204 |
| 2004/0172433 | A1 * | 9/2004 | Acharya et al. ............ 708/300 |
| 2004/0236794 | A1 * | 11/2004 | Fox .......................... 707/104.1 |

OTHER PUBLICATIONS

Bach et al.,"Multidimensional Database Technology", IEEE, 2001, pp. 40-46.*

* cited by examiner

*Primary Examiner*—Thuy Pardo
(74) *Attorney, Agent, or Firm*—Hickman Palermo Truong & Becker LLP; Edward A. Becker

(57) ABSTRACT

An approach for propagating changes from a database to a client includes providing to the client a copy of a portion of the database, wherein the portion of the database contains a first data item. An updated value of the first data item is generated that reflects the application of a plurality of changes to the first data item. The updated value of the first data item is provided to the client with operator data that indicates one or more operations to be performed to update the copy of the portion of the database at the client with the updated value of the first data item. As used herein, the term "data item" may refer to any type of data. For example, in the context of database systems, a data item may be an individual value, a database record containing several values, e.g., a row, a database table, or a group of database tables.

30 Claims, 6 Drawing Sheets

APPROACH FOR PROPAGATING CHANGES FROM A DATABASE TO A CLIENT

FIELD OF THE INVENTION

This invention relates generally to information systems and, more specifically, to an approach for propagating changes from a database to a client.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Portions of databases are sometimes distributed to clients and used for a variety of purposes, such as statistical analysis or for marketing purposes. Clients often maintain the data as "read-only" and do not allow modification of the data at the clients. The process starts with a bulk download of data from a database system to a client, also referred to as an "initial download." For example, a client may request from a database system a copy of a set of database tables that contain data that the client will process and analyze. The database system performs a bulk transfer of the requested database tables to the client and the client begins processing the data.

At some point after the initial download, changes may be made to the source database. This is particularly true in online transaction processing environments, where the frequency of changes may be quite high. At some point, because of the changes made to the source database, the copy of data provided to the client becomes outdated and no longer reflects the source database. It then becomes desirable to update the client's copy of the data, by propagating the changes made to the source database to the client. The process of propagating changes from a source database to a client is often referred to as "synchronization."

One approach for synchronizing a client with a source database is to "refresh" the client's copy of data by downloading a new copy of data from the database. A benefit of this approach is that it is relatively simplistic. The client specifies the portions of the source database to be downloaded and the data is transferred to the client. The client also does not have to process the received data. One drawback of this approach is that it requires a bulk transfer of data, which may consume a significant amount of computational resources and therefore can be very intrusive to the source database system. Furthermore, the bulk data transfer may include data that was never updated and therefore does not need to be transferred to the client. Hence, in situations where only a relatively small number of data items were updated in the source database, computational resources are wasted transferring data that the client already has.

Another approach for synchronizing a client with a source database involves the source database system providing a copy of the operations performed on the data at the source database system since the initial download to the client. Most database systems maintain a log of operations performed on their databases. In the event of a failure, the database can be reconstructed by starting with an earlier version of the database retrieved from a non-volatile storage and then processing the operations from the log against the earlier version. The benefit of this approach is that only the operations need to be provided to the client, which reduces the amount of data the must be transferred and is less intrusive to the source database system. The drawback of this approach, however, is that the client must process the operations to update its older copy of the data, which can be computationally expensive and time consuming on the client side.

Based upon the foregoing, there is a need for an approach for propagating changes from a database to a client that does not suffer from limitations in prior approaches. There is a particular need for an approach for propagating changes from a database to a client that avoids using bulk transfers to update the client after an initial download. There is a further need for an approach for propagating changes from a database to a client that avoids updating the client's older version of data by processing operations provided by a source database system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. PROPAGATION ARCHITECTURE AND OPERATION
III. OPCODES
IV. TIMESTAMPS AND INCREMENTAL UPDATES
V. DATA CLEANUP
VI. SELECTIVE UPDATES
VII. DATA INTEGRITY AND REDUNDANCY APPLICATIONS
VIII. IMPLEMENTATION MECHANISMS, ALTERNATIVES & EXTENSIONS

I. Overview

An approach for propagating changes from a database to a client includes providing to the client a copy of a portion of the database, wherein the portion of the database contains a first data item. An updated value of the first data item is generated that reflects the application of a plurality of changes to the first data item. The updated value of the first data item is provided to the client with operator data that indicates one or more operations to be performed to update the copy of the portion of the database at the client with the updated value of the first data item. As used herein, the term "data item" may refer to any type of data. For example, in the context of database systems, a data item may be an individual value, a database record containing several values, e.g., a row, a database table, or a group of database tables.

Figure 1:
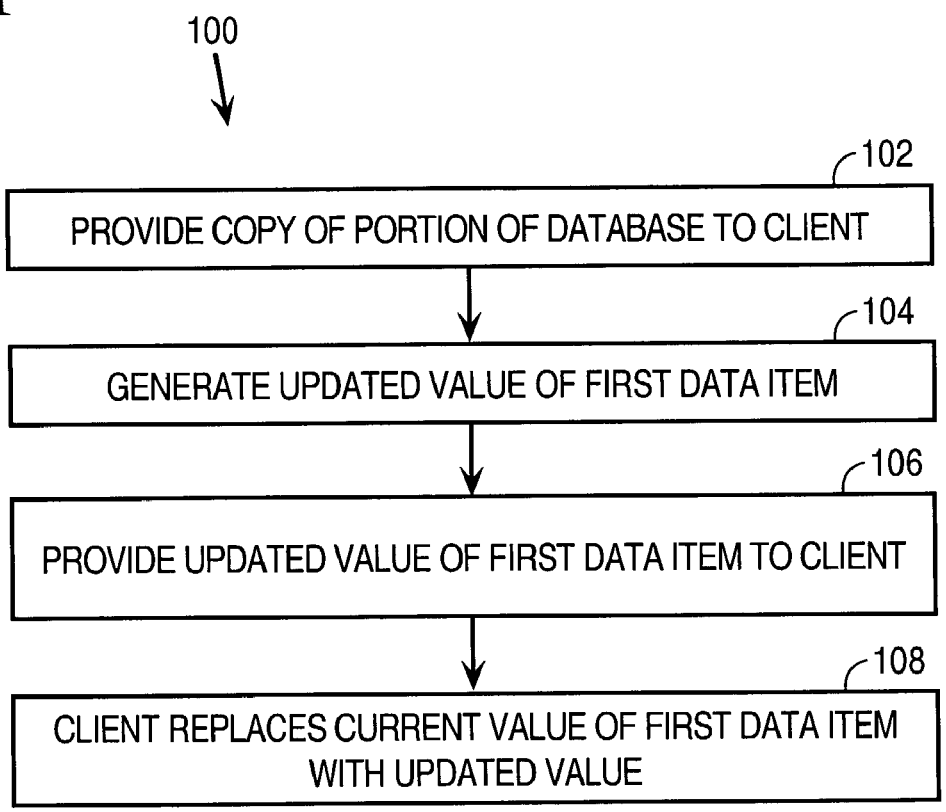
FIG. 1 is a flow diagram that depicts an approach for propagating changes from a database to a client.

FIG. 1 is a flow diagram 100 that depicts an approach for propagating changes from a database to a client according to an embodiment. In step 102, a copy of a portion of the database is provided to the client at a first time. The copy of the portion of the database contains a first data item.

In step 104, an updated value of the first data item is generated. The updated value of the first data item is a value that reflects the application of a plurality of changes to the first data item. In step 106, the updated value first data item is provided to the client for use by the client. Operator data may also be provided to the client that indicates one or more operations to be performed by the client to update the client's copy of the portion of the database with the updated value of the first data item. The operator data may specify, for example, whether the value of the updated version of the first data item is a new value, a replacement value, or whether the current value maintained by the client is to be deleted.

In step 108, the client replaces the current value of the first data item with the new value of the first data item received from the database. If the updated value of the first data item is a new value, then the client inserts the new value into its copy of the portion of the database. The operator data may also indicate that the current value maintained by the client is to be deleted from its copy of the portion of the database.

II. Propagation Architecture and Operation

Figure 2:
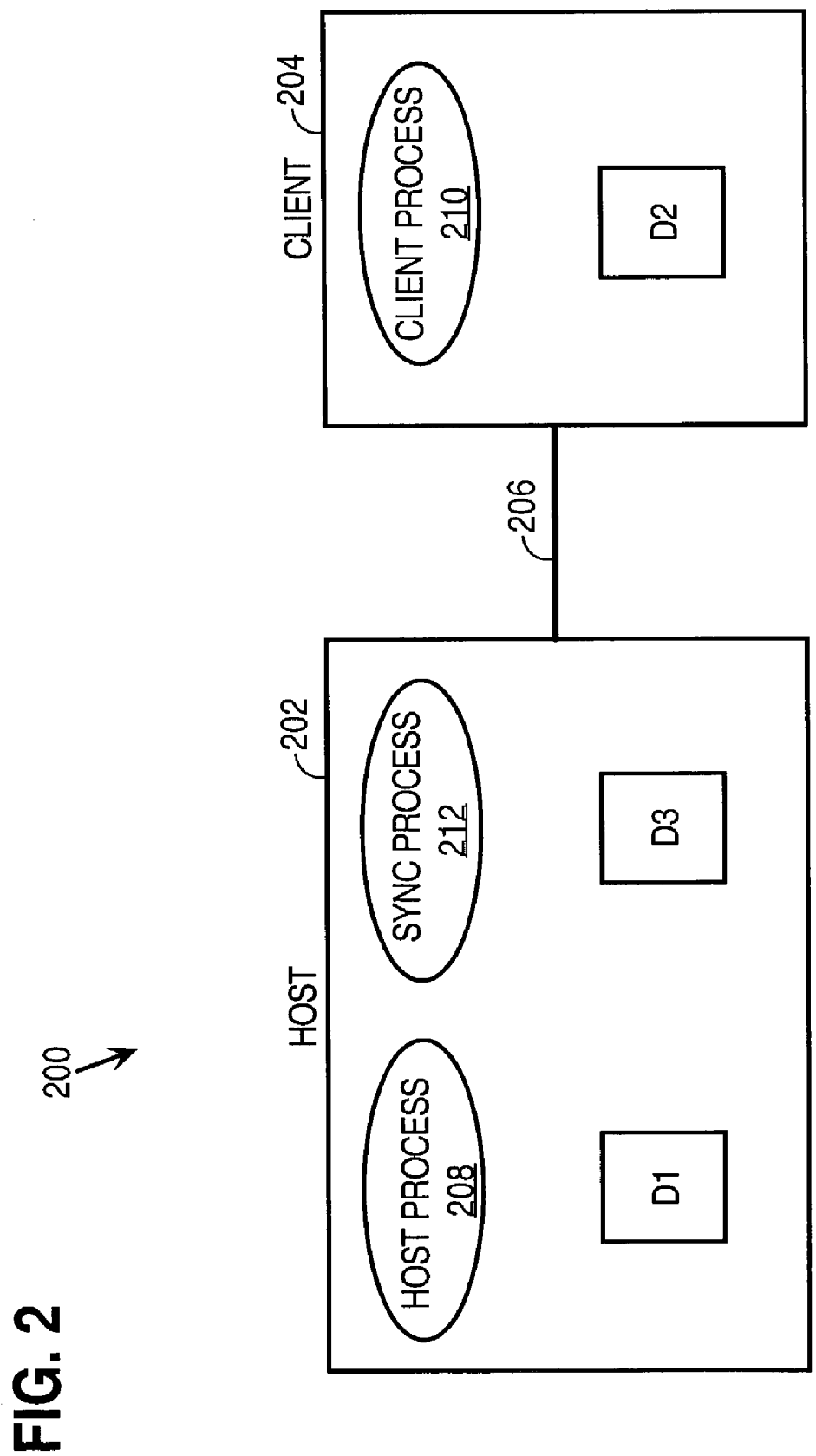
FIG. 2 is a block diagram that depicts an architecture for propagating changes from a host to a client.

FIG. 2 is a block diagram that depicts an architecture 200 for propagating changes from a host 202 to a client 204 in accordance with an embodiment. Host 202 is communicatively coupled to client 204 via a link 206. Link 206 may be implemented by any medium or mechanism that provides for the exchange of data between host 202 and client 204. Examples of link 206 include, without limitation, a network such as a Local Area Network (LAN), Wide Area Network (WAN), Ethernet or the Internet, or one or more terrestrial, satellite or wireless links.

Host 202 includes a host process 208 that manages source data D1. For example, host process 208 may be implemented as a database server process that processes queries and updates against data D1. Data D1 may be maintained in volatile storage, such as random access memory (RAM), or on a non-volatile storage, such as a hard disk, flash memory, tape storage or optical medium.

Client 204 includes a client process 210 that manages data D2. Data D2 initially contains a copy of at least a portion of data D1 on host 202. Client process 210 also requests updates for data D2 from host 202. The requests may be made by client process 210 to host 202 using any type of communications protocol, depending upon the requirements of a particular application. According to one embodiment, client process 210 makes using the Common Object Request Broker Architecture (CORBA).

Host 202 includes a synchronization (sync) process 212 that propagates changes in data D1 to data D2 on client 204. Data may be provided from host 202 to client 204 using any type of bulk data transfer protocol, for example, File Transfer Protocol (FTP).

According to an embodiment, changes made to data D1 over time are maintained in data D3. According to an embodiment, data D3 contains current values of data from data D1 that have been changed. For example, suppose that data D1 includes a particular data item that has been updated several times. Data D3 contains the current value of the particular data item, where the current value reflects all changes that have been made to the particular data item up to that point in time.

Figure 3A:
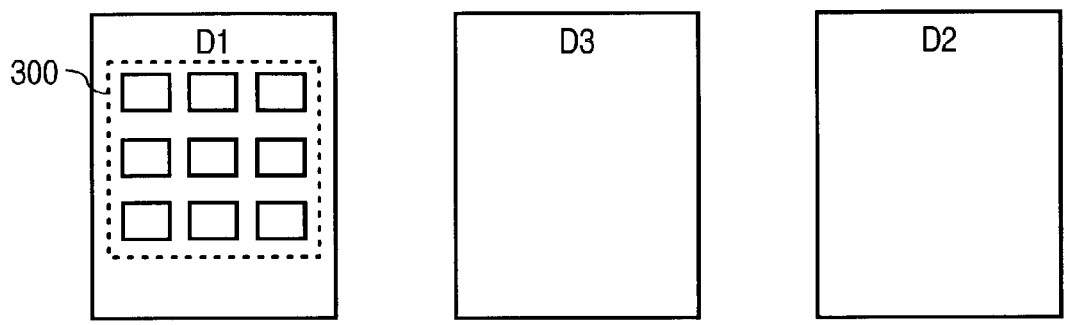
FIGS. 3A–3G are block diagrams that depict the states of data as changes in data on a host are propagated to a client.

FIGS. 3A–3G are block diagrams that depict the states of data D1, D2 and D3 as changes in data D1 on host 202 are propagated to client 204 in accordance with an embodiment. As depicted in FIG. 3A, data D1 includes a set of data items 300 that are to be propagated to client 204. At this point, data D2 and D3 do not contain any of the data items from data items 300.

Figure 3B:
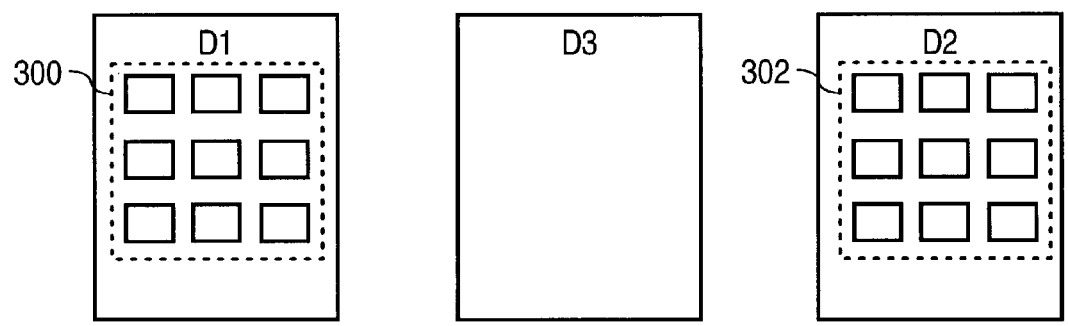

As depicted in FIG. 3B, host 202 performs an initial download of data items 300 to client 204, which are stored in data D2 as data items 302. For example, suppose that host 202 maintains employee data for a company. In this situation, the initial download of data items 300 provides client 204 with a copy of the employee data maintained on host 202. Client 204 may then use the employee data, for example, by client process 210 performing an analysis of the employee data. As described in more detail hereinafter, the initial download of data items 300 may include only a portion of data items 300.

Figure 3C:
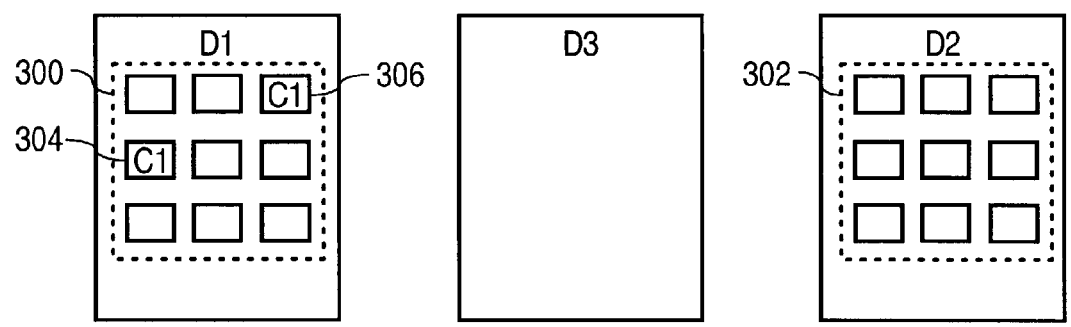

At some time later, as depicted in FIG. 3C, changes are made to data items 300. Specifically, changes, designated by "C1", are made to data items 304 and 306. The changes may be made, for example, by host process 208 processing update requests submitted to host 202 by clients.

Figure 3D:
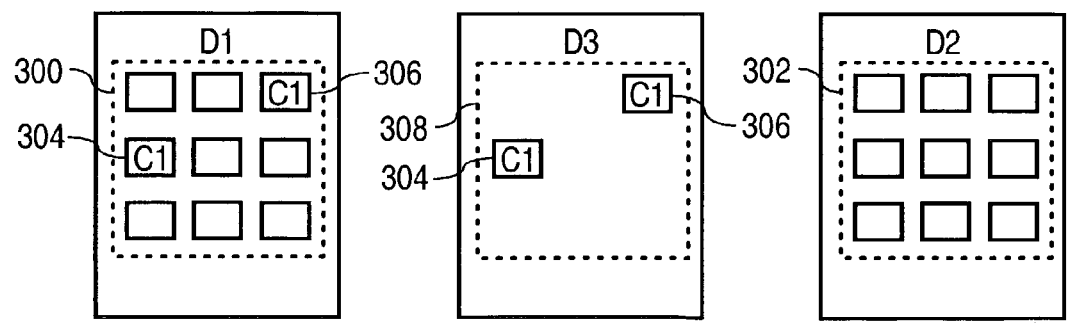

As depicted in FIG. 3D, the changes made to data items 300, i.e., changes C1 made to data items 304 and 306, are propagated to data D3 on host 202. At this point in time, data D3 contains a set of data items 308 that include the values of data items 304 and 306 after the application of changes C1. Data items 308 do not include the other member data items of data items 300 in data D1 that were not updated. Furthermore, data items 302 on client 204 do not yet include any of the changes made to data items 300.

The changes to data items 300 may be made to data items 308 using a variety of techniques, depending upon the requirements of a particular application. For example, in the context of a database management application where data items 300 are stored in a table, triggers may be used. When an update is made to the table, a trigger is activated or "fired" which causes data D3, in the form of a table, to be updated with the updated values in data D1.

Figure 3E:
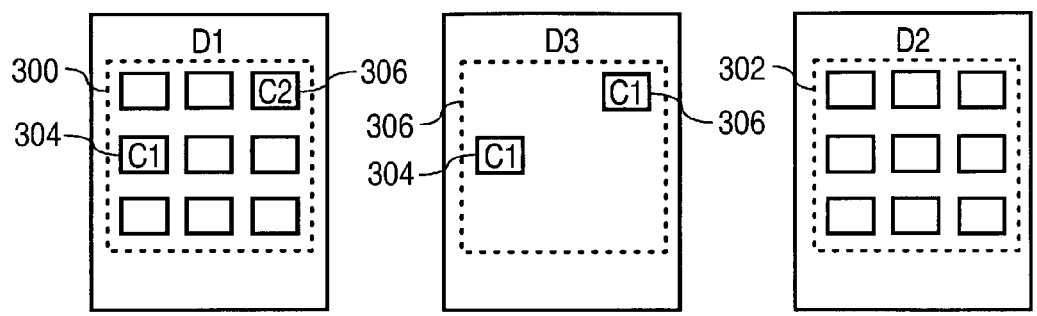
Figure 3F:
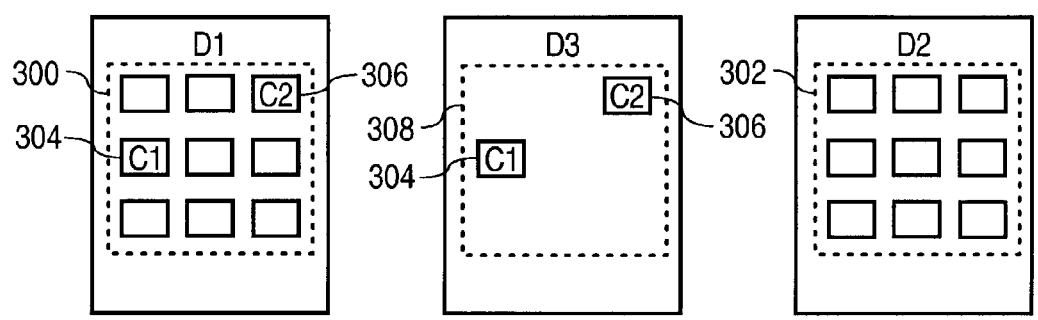

As depicted in FIG. 3E, additional changes are made to data items 300 on host 202. Specifically, data item 306 is updated with a second change C2. As depicted in FIG. 3F, the updated version of data item 306 is stored in data D3. At this point in time, data items 308 include the values of data item 304 after change C1 was applied and the value of data item 306 after both changes C1 and C2 were applied.

At a later point in time, a determination is made to propagate changes made to data items 300 on host 202 to client 204. The determination may be made in a variety of ways, depending upon the requirements of a particular application. For example, after providing the initial download to client 204, host 202 may periodically propagate changes to client 204 based upon a schedule or timetable. Alternatively, client 204 may request that changes in data items 300 be propagated to client 204. For example, client process 210 may request an update from sync process 212.

Figure 3G:
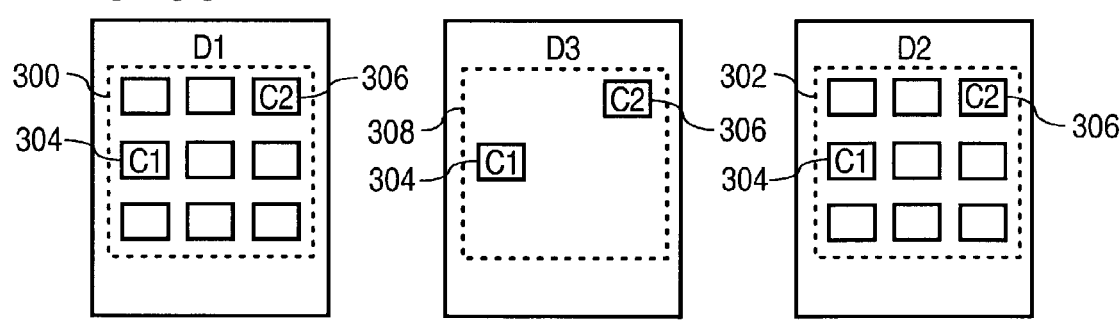

As depicted in FIG. 3G, the values of data items 308 in data D3 are propagated to client 204 and added to data items 302. After the transfer, data items 302 include the values of data item 304 after change C1 was applied and the value of data item 306 after both changes C1 and C2 were applied. In this situation, client 204 never "sees" the value of data item 306 after change C1 was applied, but before change C2 was applied, since change C2 was applied to data item 306 before the value of data item 306 was provided to client 204. Any number of changes may be applied to data items 308 before being transferred to client 204. Thus, data D2 reflects the net values in data D3 after any number of changes have been made to data D3 since the last time data D3 was propagated to client 204. This avoids client 204 having to apply changes to data items as is done at host 202. Whether data D2 contains the same data as data D1 depends upon the frequency of updates made to data D1, the frequency at which changes in data D1 are reflected in data D3 and the frequency at which data D3 is provided to client 204.

Data D1 and D3 may be stored on a common storage device, such as one or more disks on host 202. Alternatively, data D1 and D3 may be stored on separate storage devices, depending upon the requirements of a particular application.

Although embodiments have been depicted an described in the context of propagating changes in data from host 202 to a single client 204, the approach is applicable to any number of clients 204, as is described in more detail hereinafter. Furthermore, multiple hosts may be used to provide data redundancy, as is also described in more detail hereinafter. Hence, a one-to-one ratio of hosts to clients is not required.

III. Opcodes

As previously described herein, client process 210 requests an update for data D2 and the values maintained in data D3 are provided to client 204. Client process 210 then updates data D2 with the changes from host 202. According to one embodiment, host 202 is configured to provide action data to client 204 that indicates an action that client 204 needs to perform to update data D2 with the updated data values from host 202. For example, when host 202 sends the updated values for data items 304 and 306 to client 204, host 202 also sends action data that indicates that the current values for data items 304 and 306 maintained in data items 302 should be replaced with the new values for data items 304 and 306. The action data may be provided to client 202 with, or separate from, the new values for data items 304 and 306. The action data may also be maintained on host 202 in association with data D3.

According to one embodiment, the action data is in the form of an operational code (opcode). When an updated value is added to data D3, an opcode is generated that specifies an operation that client 204 needs to perform to update data D2 to reflect the updated value. For example, referring to FIG. 3D, when the change C1 made to data item 304 is propagated to data D3, an opcode is generated that specifies that the value for data item 304 in data D2 will need to be replaced with the value of data item 304 stored in data D3. The opcode is provided to client 204 and client process 210 performs the action specified by the opcode. In the present example, client process 210 replaces the current value of data item 304 in data items 302 with the updated value for data item 304 provided by host 202.

Opcodes may also be used with new data items and deleted data items. For example, suppose that data items 302 did not include data item 304. In this situation, the opcode provided by host 202 to client 204 specifies that the value of data item 304 is a new value that needs to be added to data items 302. Alternatively, if data item 304 is deleted from data D1, then the opcode specifies that data item 304 is to be deleted. In this situation, when the changes in data D3 are propagated to client 204, then client process 210 deletes data item 304 from data items 302. For deletions, the opcode may specify the deletion of an individual data value, a record containing one or more data values, one or more keys in a table or one or more tables, depending upon the requirements of a particular application.

According to one embodiment, an opcode value of "N" is used to designate new or updated values and an opcode value of "D" is used to designate deleted values. Thus, if client process 210 receives a data item value with a corresponding opcode value of "N", then client process 210 either adds the data item value to data items 302, if the data item does not exist in data items 302, or replaces the data item value with the new value if the data item already exists in data items 302.

According to one embodiment, data D2 is implemented in one or more database tables and for an opcode value of "N", client process 210 performs an UPDATE function on data D2 without first determining whether data D2 contains a value for the data item. If the processing of the update function causes an error, then client process 210 performs an INSERT function on data D2 with the new value. In some database management environments, this technique has been found to be less "computationally expensive" i.e., require relatively fewer computational resources and/or time, than first determining whether the data item exists in the target table and then performing either and update or insert based upon the results.

When a data item is deleted from data D1, the value of the deleted data item does not need to be propagated to data D3 and then data D2 on client 204. Instead, the data item can be identified as needing to be deleted. For example, suppose that data item 304 is deleted in data D1. When the changes in data D1 are propagated to data D3, an opcode with a value of "D" is created to indicate that data item 304 is to be deleted. The opcode is stored in association with data item 304 in data D3. For example, if data D3 is in the form of a database table, then the opcode may be stored in the table. The opcode and data that identify data item 304 are then provided to client 204 when updates are propagated to client 204.

Opcodes are stored in association with data items 308 so that opcodes may be provided to client 204 with the new values for data items 308. According to one embodiment, data D3 is stored as one or more database tables, where each table has an opcode column that contains opcodes for data items 308.

IV. Timestamps and Incremental Updates

In situations where a client has received an initial download of data and at least one update, it may not be necessary to provide all of the updated data to the client on the next update. For example, referring to FIG. 3G, suppose that after client 204 receives data items 308 from host 202, a change C3 is made to data item 306 and the change is propagated to data D3. On the next update request from client 204, it is not necessary to supply the updated value of data item 304 with the change C1 because client 204 already has this value, from the last update. Rather, client 204 only needs to receive the updated value of data item 306 that reflects the application of change C3.

According to one embodiment, timestamps are used to identify the particular changes that are to be supplied to a client. According to this approach, data item values stored in data D3 have associated timestamps that indicate when the change was made in data D3. Also, a time at which changes were last propagated to a particular client is maintained. This time is referred to herein as a Last Synchronization Time (LST) and is client specific. When a particular client requests an update, the values of data items having a timestamp that is greater, i.e., more recent, than the LST for the particular client are provided to the particular client, since older changes that the client already has are not again provided to the client. This approach reduces the amount of data that needs to be supplied to clients. The approach may be applied in multiple client applications, in which case a separate LST is maintained for each client.

Figure 4:
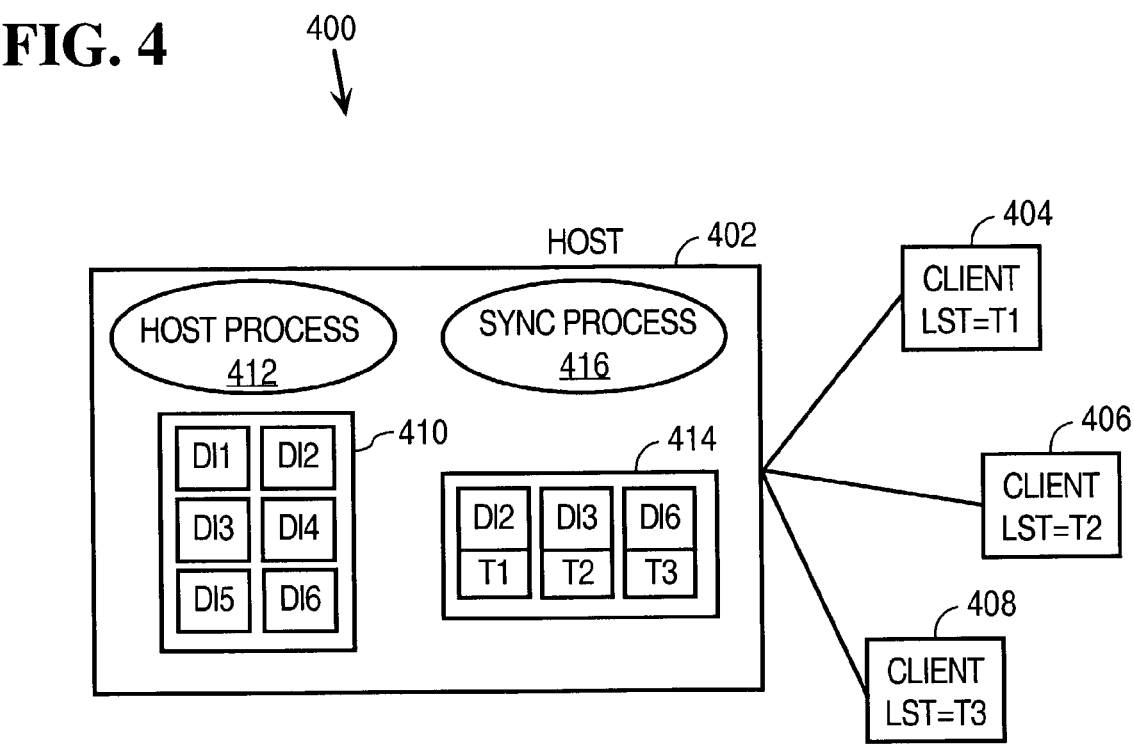
FIG. 4 is a block diagram that depicts an arrangement in which data is propagated from a host to clients.

FIG. 4 is a block diagram that depicts an arrangement 400 in which data is propagated from a host 402 to clients 404, 406, 408 using timestamps. Host 402 maintains a set of data items 410 that includes six data items identified as DI1–DI6. Data items 410 are managed by a host process 412. Host 402 also includes change data 414 that includes the updated values of data items 410 that have been changed. In the present example, change data 414 includes data for data items DI2, DI3 and DI6. Change data 414 also includes time stamps T1, T2 and T3, associated with data items DI2, DI3 and DI6, respectively, that indicate the times at which data items DI2, DI3 and DI6 were last updated. A synchronization (sync) process 416 processes requests from clients 404, 406, 408 for updated data.

Clients 404, 406, 408 each have an LST that represents the last time each client was synchronized with host 402, i.e., the time at which changes to data items 410 were last propagated to each client. The LST for a particular client is established when the particular client receives the initial download of data from host 402. Thereafter, the LST for the particular client is updated each time the particular client receives an update. In the present example, each client 404, 406, 408 has received at least an initial download and therefore has an associated LST. The LST data is maintained on host 402, but is depicted in FIG. 4 with each client 404, 406, 408 for explanation purposes.

When a client 404, 406, 408 makes a request to host 402 for updated data, the LST for the requesting client is compared to the timestamps contained in change data 414 to determine which portions of change data 414 are to be provided to the requesting client. Change data 414 having a time stamp that is more recent than the LST of the requesting client is provided to the requesting client.

Figure 5:
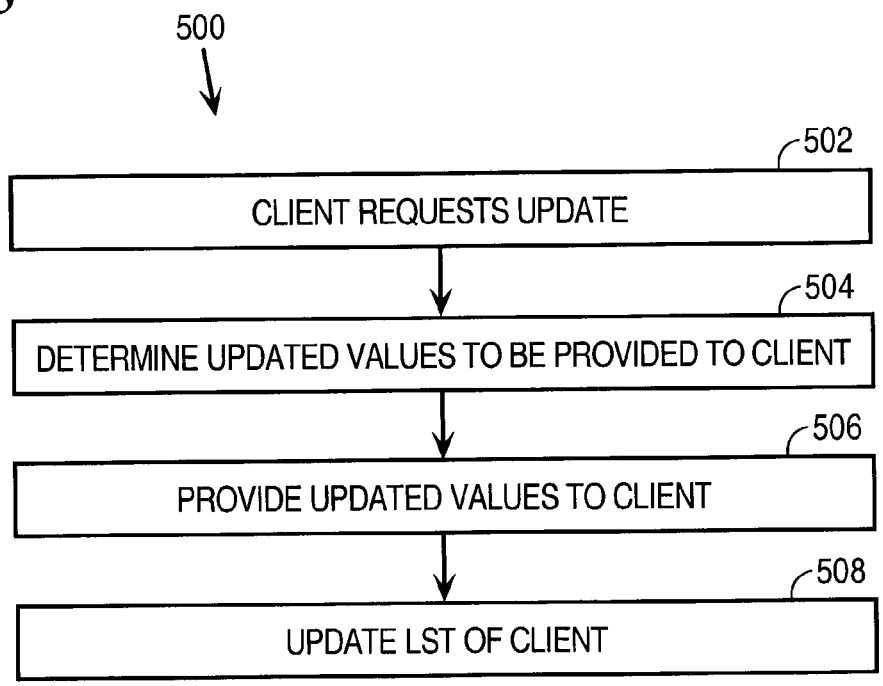
FIG. 5 is a flow diagram that depicts an approach for propagating changes from a host to a client using timestamps.

FIG. 5 is a flow diagram 500 that depicts an approach for propagating changes from host 402 to client 406 using timestamps according to an embodiment. In step 502, client 406 requests an update of data items 410. This may be accomplished, for example, by client 406 sending a request to sync process 416 on host 402.

In step 504, the change data to be supplied to client 406 is determined. According to one embodiment, sync process 416 makes this determination by comparing the LST of client 406 to time stamps associated with change data 414. In the present example, client 406 has an LST of time T2. Since the values in change data 414 for data item DI2 was updated before time T2, namely at time T1, client 406 already has this value and it does not need to be provided to client 406. The values for data items DI3 and DI6, however, were updated at times T2 and T3, respectively, and are therefore not known to client 406.

Accordingly, in step 506, sync process 416 provides the updated values of data items DI3 and DI6 to client 406 from change data 414.

In step 508, the LST for client 406 is updated to reflect the time at which the updated values for data item DI6 were provided to client 406. In the present example, if the current time is T5, then sync process 416 updates the LST for client 406 to time T5.

Clients may be synchronized with hosts as frequently as is desired for a particular application. With a sufficiently high synchronization frequency, it is possible for clients to achieve near real-time synchronization (NRTS).

V. Data Cleanup

As changes are made to source data over time, the change data maintained by a host continues to grow. This requires more and more computational resources as the change data is backed up to a non-volatile storage medium. Furthermore, processing client requests for updates requires more computational resources as a greater number of timestamps need to be checked.

According to one embodiment, timestamps and LSTs are used to reduce the amount of change data that must be maintained by a host. This process is referred to as a "cleanup." To perform a cleanup, sync process 416 identifies for cleanup all change data 414 having a timestamp that is older than the oldest LST of clients 404, 406, 408. For example, suppose that the LST for client 404 was T2 instead of T1. In this situation, the oldest LST is time T2, for both clients 404 and 406. Sync process 416 identifies entries in change data 414 having a time stamp of older than time T2, which in the present example, is the value of data item DI2. This data is not needed by clients 404, 406, 408 since their data has already been updated with the new value for data item DI2 from change data 414. This data will also not be needed by any new clients that connect to host 402 since the new value of data item DI2 is reflected in data items 410, which the new clients will receive during the initial upload. Accordingly, sync process 416 deletes the change data for data item DI2 from change data 414.

The cleanup may be performed periodically or on an as-needed basis, depending upon the requirements of a particular application. The time between cleanups may be dynamically adjusted depending upon the amount of data that was removed in prior cleanups. For example, if the prior N number of cleanups resulted in little or no change data being deleted, then the amount of time between cleanups may be increased. Similarly, if a determination is made that a large amount of change data is being removed during cleanups, then the time between cleanups may be decreased.

VI. Selective Updates

The approach described herein for propagating changes from a database to a client is also applicable to situations where it is desirable for a client to receive updates for only portions of a host database. According to one embodiment, clients may subscribe to receive one or more portions of a host database and then receive updates on only the selected portions. A database schema may be provided to clients that select one or more portions to receive. For example, referring to FIG. 4, suppose that client 404 is interested in data items DI2 and DI6, but not data items DI1 and DI3–DI5. Client 404 registers with host 402 to receive an initial upload of data items DI2 and DI6 and updates thereafter. As part of the registration process, host 402 creates and maintains registration data that indicates that client 404 is to receive an initial upload of data items DI2 and DI6 and updates thereafter. When client 404 requests an update from host 402, sync process 416 first examines the registration data for client 404 to identify the particular data items that are to be updated for client 404. Sync process 416 then provides client 404 with updated data for data items DI2 and DI6 according to the approach described herein.

Client registrations may be changed over time to accommodate changing needs of clients. In the prior example, sometime later it may be desirable for client 404 to receive data item ID5. Client 404 updates its registration with host 402 to also receive data item ID5. On the next update, client 404 will also receive either the last updated value for data item ID5 maintained in change data 414, or if not available, then the value for data item ID5 from data items 410.

VII. Data Integrity and Redundancy Applications

According to one embodiment, previous LSTs (PLSTs) are also maintained by host 402 for each client. Maintaining PLSTs allows a client that has failed to be restored to a prior state. For example, in the event that a particular client fails, all data items for which the particular client is registered, having timestamps earlier than the PLST for the particular client, are provided to the particular client. In the situation where PLSTs are used, the cleanup procedure uses the earliest client PLST instead of earliest LST. Thus, to perform a cleanup, sync process 416 deletes all change data 414 having a timestamp that is older than the oldest PLST of clients 404, 406, 408.

The approach described herein for propagating changes from a database to a client is applicable to applications where multiple hosts are used to provide data redundancy. For example, suppose that a particular client, such as client 404, is communicatively coupled to two hosts, such as host 402. In this arrangement, the hosts would typically employ a consistency mechanism to maintain consistency between the two hosts. If one of the hosts fails, then client 404 can continue to receive updates from the surviving host. In this situation, the LST of client 404, and PLST if used, is maintained on each of the hosts so that updates can continue to be provided if one of the hosts fails. When one of the hosts provides an update to client 404, the host that provided the updated data updates the LST for client 404 and also shares the updated LST with the other host. Alternatively, client 404 may cause the LST on the other host to be updated. For example, client 404 may invoke a 'mark sync time' operation that causes the LST on the other host to be updated and does not return any data. This approach is applicable to any number of hosts and client, depending upon the requirements of a particular application.

VIII. Implementation Mechanisms, Alternatives & Extensions

The approach described herein for propagating changes from a database to a client avoids using bulk transfers to update the client after an initial download has been performed. The use of timestamps also reduces the amount that is transferred to clients for updates and also reduces the amount of data that must be maintained by a host. This reduces the overhead associated with making updates and eliminates the transfer of data items that were not updated since the last synchronization and therefore do not need to be transferred. The approach also eliminates the need for clients to update an older version of data by processing operations provided by a source database system against the older version of data. Rather, clients need only add, replace or delete values, which reduces the amount of computational resources used at clients.

The approach described herein for propagating changes from a database to a client is applicable to a variety of contexts and the approach is not limited to any particular context. For example, the approach is applicable to network management applications where network configuration data is centrally maintained by host 202 and distributed to a variety of clients, such as client 204.

Although embodiments of the invention have been depicted and described in the context of the sync processes 212 and 416 being disposed on hosts 202 and 402, respectively, the invention is not limited to this context. For example, sync processes 212 and 416 may be disposed external to hosts 202 and 402. Furthermore, the functionality of sync processes 212 and 416 may be implemented by any type of synchronization mechanism implemented in hardware, computer software, or a combination of hardware and computer software, depending upon the requirements of a particular application.

Figure 6:
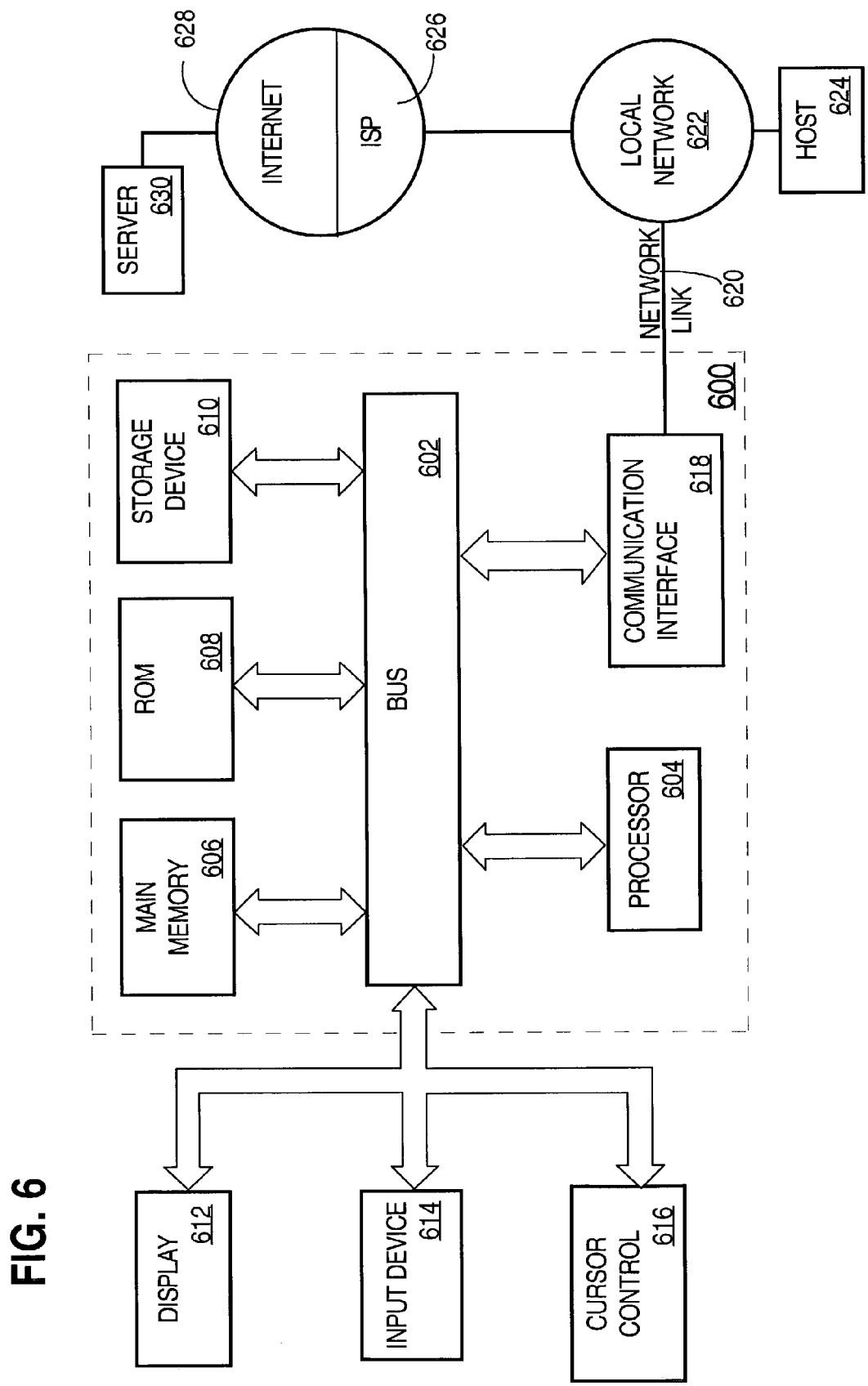
FIG. 6 is a block diagram that depicts a computer system on which embodiments of the present invention may be implemented.

FIG. 6 is a block diagram that illustrates a computer system 600 upon which an embodiments may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for propagating changes from a database to a client. According to one embodiment, the propagation of changes from a database to a client is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for propagating changes from a database to a client as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for propagating changes from a database to a client, the method comprising the computer-implemented steps of:

providing to the client, at a first time, a copy of a portion of the database, wherein the portion of the database contains at least a first data item and a second data item;

generating, at a second time, an updated value of the first data item, wherein the updated value of the first data item reflects the application of a first plurality of changes to the first data item;

generating, at a third time, an updated value of the second data item, wherein the updated value of the second data item reflects the application of a second plurality of changes to the second data item;

selecting the updated value of the first data item from the updated value of the first data item and the updated value of the second data item based upon the first time at which the copy of the portion of the database was provided to the client being earlier than the second time at which at which the updated value of the first data item was generated and the first time being later than the third time at which at which the updated value of the second data item was generated; and providing the updated value of the first data item to the client with operator data that indicates one or more operations to be performed at the client to update the copy of the portion of the database at the client with the updated value of the first data item.

2. The method as recited in claim 1, wherein:

the updated value of the first data item was provided to the client at a fourth time that is after the second time; and the method further comprises the computer-implemented step of deleting the updated value of the first data item based upon the fourth time at which the first data item was provided to the client being after the second time at which at which the updated value of the first data item was generated.

3. The method as recited in claim 1, further comprising the computer-implemented steps of:

generating a second updated value of the first data item, wherein the second updated value of the first data item reflects the application of a plurality of additional changes to the first data item; and providing the second updated value of the first data item to the client with additional operator data that indicates one or more operations to be performed at the client to update the copy of the portion of the database at the client with the second updated value of the first data item.

4. The method as recited in claim 1, further comprising the computer-implemented step of receiving a registration request from the client that indicates that the client is to receive updated values of the first data item.

5. The method as recited in claim 1, wherein the value of the first data item contained in the copy of the portion of the database provided to the client had an initial value and the operator data specifies that the initial value of the first data item is to be replaced with the updated value of the first data item.

6. The method as recited in claim 1, further comprising the computer-implemented steps of:
   in response to the addition of a third data item to the portion of the database after the copy of the portion of the database was provided to the client, generating a value of the third data item; and
   providing the value of the third data item to the client with additional operator data that indicates that the value of the third data item is a new value that is to be added to the copy of the portion of the database at the client.

7. A computer-readable storage medium for propagating changes from a database to a client, the computer-readable storage medium carrying one or more sequences of instructions which, when executed by one or more processors, cause the one or more processors to perform the steps of:
   providing to the client, at a first time, a copy of a portion of the database, wherein the portion of the database contains at least a first data item and a second data item;
   generating, at a second time, an updated value of the first data item, wherein the updated value of the first data item reflects the application of a first plurality of changes to the first data item;
   generating, at a third time, an updated value of the second data item, wherein the updated value of the second data item reflects the application of a second plurality of changes to the second data item;
   selecting the updated value of the first data item from the updated value of the first data item and the updated value of the second data item based upon the first time at which the copy of the portion of the database was provided to the client being earlier than the second time at which at which the updated value of the first data item was generated and the first time being later than the third time at which at which the updated value of the second data item was generated; and
   providing the updated value of the first data item to the client with operator data that indicates one or more operations to be performed at the client to update the copy of the portion of the database at the client with the updated value of the first data item.

8. The computer-readable medium as recited in claim 7, wherein:
   the updated value of the first data item was provided to the client at a fourth time that is after the second time; and
   A computer-readable medium further comprises one or more sequences of additional instructions which, when executed by the one or more processors, cause the one or more processors to perform the step of deleting the updated value of the first data item based upon the fourth time at which the first data item was provided to the client being after the second time at which at which the updated value of the first data item was generated.

9. The computer-readable medium as recited in claim 7, further comprising one or more sequences of additional instructions which, when executed by the one or more processors, cause the one or more processors to perform the steps of:
   generating a second updated value of the first data item, wherein the second updated value of the first data item reflects the application of a plurality of additional changes to the first data item; and
   providing the second updated value of the first data item to the client with additional operator data that indicates one or more operations to be performed at the client to update the copy of the portion of the database at the client with the second updated value of the first data item.

10. The computer-readable medium as recited in claim 7, further comprising one or more sequences of additional instructions which, when executed by the one or more processors, cause the one or more processors to perform the step of receiving a registration request from the client that indicates that the client is to receive updated values of the first data item.

11. The computer-readable medium as recited in claim 7, wherein the value of the first data item contained in the copy of the portion of the database provided to the client had an initial value and the operator data specifies that the initial value of the first data item is to be replaced with the updated value of the first data item.

12. The computer-readable medium as recited in claim 7, further comprising one or more sequences of additional instructions which, when executed by the one or more processors, cause the one or more processors to perform the steps of:
   in response to the addition of a third data item to the portion of the database after the copy of the portion of the database was provided to the client, generating a value of the third data item; and
   providing the value of the third data item to the client with additional operator data that indicates that the value of the third data item is a new value that is to be added to the copy of the portion of the database at the client.

13. An apparatus for propagating changes from a database to a client, the apparatus comprising a synchronization mechanism configured to:
   provide to the client, at a first time from a memory on a host, a copy of a portion of the database stored in the memory on the host, wherein the portion of the database contains at least a first data item and a second data item;
   generate, at a second time in the memory on the host, an updated value of the first data item, wherein the updated value of the first data item reflects the application of a first plurality of changes to the first data item;
   generate, at a third time in the memory on the host, an updated value of the second data item, wherein the updated value of the second data item reflects the application of a second plurality of changes to the second data item;
   select the updated value of the first data item from the updated value of the first data item and the updated value of the second data item based upon the first time at which the copy of the portion of the database was provided from the memory on the host to the client being earlier than a the second time at which at which the updated value of the first data item from the memory on the host was generated and the first time being later than the third time at which at which the updated value of the second data item was generated; and provide the updated value of the first data item to the client with operator data that indicates one or more operations to be performed at the client to update the copy of the portion of the database at the client with the updated value of the first data item.

14. The apparatus as recited in claim 13, wherein:

the updated value of the first data item was provided to the client at a fourth time that is after the second time; and wherein the synchronization mechanism is further configured to delete the updated value of the first data item based upon the fourth time at which the first data item was provided to the client being after the second time at which at which the updated value of the first data item was generated.

15. The apparatus as recited in claim 13, wherein the synchronization mechanism is further configured to:

generate a second updated value of the first data item, wherein the second updated value of the first data item reflects the application of a plurality of additional changes to the first data item; and provide the second updated value of the first data item to the client with additional operator data that indicates one or more operations to be performed at the client to update the copy of the portion of the database at the client with the second updated value of the first data item.

16. The apparatus as recited in claim 13, wherein the synchronization mechanism is further configured to receive a registration request from the client that indicates that the client is to receive updated values of the first data item.

17. The apparatus as recited in claim 13, wherein the value of the first data item contained in the copy of the portion of the database provided to the client had an initial value and the operator data specifies that the initial value of the first data item is to be replaced with the updated value of the first data item.

18. The apparatus as recited in claim 13, wherein the synchronization mechanism is further configured to:

in response to the addition of a third data item to the portion of the database after the copy of the portion of the database was provided to the client, generate a value of the third data item; and provide the value of the third data item to the client with additional operator data that indicates that the value of the third data item is a new value that is to be added to the copy of the portion of the database at the client.

19. An apparatus for propagating changes from a database to a client, the apparatus comprising:

means for providing to the client from a memory on a host a copy of a portion of the database, wherein the portion of the database stored in the memory on the host contains at least a first data item and a second data item;

means for generating an updated value of the first data item in the memory on the host, wherein the updated value of the first data item reflects the application of a first plurality of changes to the first data item;

means for generating an updated value of the second data item in the memory on the host, wherein the updated value of the second data item reflects the application of a second plurality of changes to the second data item;

means for selecting the updated value of the first data item from the updated value of the first data item and the updated value of the second data item based upon a first time at which the copy of the portion of the database was provided from the memory on the host to the client being earlier than a second time at which at which the updated value of the first data item from the memory on the host was generated and the first time being later than a third time at which at which the updated value of the second data item was generated; and means for providing the updated value of the first data item to the client with operator data that indicates one or more operations to be performed at the client to update the copy of the portion of the database at the client with the updated value of the first data item.

20. The apparatus as recited in claim 19, wherein:

the updated value of the first data item was provided to the client at a fourth time that is after the second time; and wherein the apparatus further comprises means for deleting the updated value of the first data item based upon the fourth time at which the first data item was provided to the client being after the second time at which at which the updated value of the first data item was generated.

21. The apparatus as recited in claim 19, further comprising:

means for generating a second updated value of the first data item, wherein the second updated value of the first data item reflects the application of a plurality of additional changes to the first data item; and means for providing the second updated value of the first data item to the client with additional operator data that indicates one or more operations to be performed at the client to update the copy of the portion of the database at the client with the second updated value of the first data item.

22. The apparatus as recited in claim 19, further comprising means for receiving a registration request from the client that indicates that the client is to receive updated values of the first data item.

23. The apparatus as recited in claim 19, wherein the value of the first data item contained in the copy of the portion of the database provided to the client had an initial value and the operator data specifies that the initial value of the first data item is to be replaced with the updated value of the first data item.

24. The apparatus as recited in claim 19, further comprising:

means for in response to the addition of a third data item to the portion of the database after the copy of the portion of the database was provided to the client, generating a value of the third data item; and means for providing the value of the third data item to the client with additional operator data that indicates that the value of the third data item is a new value that is to be added to the copy of the portion of the database at the client.

25. An apparatus for propagating changes from a database to a client, the apparatus comprising:

means for providing to the client, at a first time from a memory on a host, a copy of a portion of the database, wherein the portion of the database stored in the memory on the host contains at least a first data item and a second data item;

means for generating, at a second time in the memory on the host, an updated value of the first data item, wherein the updated value of the first data item reflects the application of a first plurality of changes to the first data item;

means for generating, at a third time in the memory on the host, an updated value of the second data item, wherein the updated value of the second data item reflects the application of a second plurality of changes to the second data item;

means for selecting the updated value of the first data item from the updated value of the first data item and the updated value of the second data item based upon the first time at which the copy of the portion of the database was provided from the memory on the host to the client being earlier than the second time at which at which the updated value of the first data item from the memory on the host was generated and the first time being later than the third time at which at which the updated value of the second data item was generated; and means for providing the updated value of the first data item to the client with operator data that indicates one or more operations to be performed at the client to update the copy of the portion of the database at the client with the updated value of the first data item.

26. The apparatus as recited in claim 25, wherein:

the updated value of the first data item was provided to the client at a fourth time that is after the second time; and the apparatus method further comprises means for deleting the updated value of the first data item based upon the fourth time at which the first data item was provided to the client being after the second time at which at which the updated value of the first data item was generated.

27. The apparatus as recited in claim 25, further comprising means for:

generating a second updated value of the first data item, wherein the second updated value of the first data item reflects the application of a plurality of additional changes to the first data item; and providing the second updated value of the first data item to the client with additional operator data that indicates one or more operations to be performed at the client to update the copy of the portion of the database at the client with the second updated value of the first data item.

28. The apparatus as recited in claim 25, further comprising means for receiving a registration request from the client that indicates that the client is to receive updated values of the first data item.

29. The apparatus as recited in claim 25, wherein the value of the first data item contained in the copy of the portion of the database provided to the client had an initial value and the operator data specifies that the initial value of the first data item is to be replaced with the updated value of the first data item.

30. The apparatus as recited in claim 25, further comprising means for:

in response to the addition of a third data item to the portion of the database after the copy of the portion of the database was provided to the client, generating a value of the third data item; and providing the value of the third data item to the client with additional operator data that indicates that the value of the third data item is a new value that is to be added to the copy of the portion of the database at the client.

* * * * *